United States Patent
Bruzzo

(10) Patent No.: US 7,222,500 B1
(45) Date of Patent: May 29, 2007

(54) METHOD AND DEVICE FOR ABSORPTION COOLING

(75) Inventor: Vitale Bruzzo, Vicenza (IT)

(73) Assignee: Ecoclim SA, Sion (CH)

( * ) Notice: Subject to any disclaimer, the term of this patent is extended or adjusted under 35 U.S.C. 154(b) by 0 days.

(21) Appl. No.: 10/070,300

(22) PCT Filed: Sep. 4, 2000

(86) PCT No.: PCT/IB00/01246

§ 371 (c)(1),
(2), (4) Date: Jun. 14, 2002

(87) PCT Pub. No.: WO01/18463

PCT Pub. Date: Mar. 15, 2001

(30) Foreign Application Priority Data

Sep. 8, 1999 (EP) .................................. 99810805
Feb. 7, 2000 (EP) .................................. 00102520

(51) Int. Cl.
*F25B 15/00* (2006.01)
*F25B 27/00* (2006.01)

(52) U.S. Cl. ........................... 62/476; 62/238.3; 62/101

(58) Field of Classification Search .................. 62/476, 62/238.3, 101, 489, 106, 107
See application file for complete search history.

(56) References Cited

U.S. PATENT DOCUMENTS 3,750,419 A * 8/1973 Bawel ........................ 62/141
4,269,041 A 5/1981 Holldorff
4,509,341 A * 4/1985 Zimmern ...................... 62/512
5,231,849 A 8/1993 Rosenblatt
5,351,504 A * 10/1994 Giacometti et al. ........... 62/476
5,372,013 A * 12/1994 Lau et al. ...................... 62/174
5,937,660 A * 8/1999 Lau et al. ...................... 62/174

FOREIGN PATENT DOCUMENTS

| DE | 960996 C | 7/1957 |
| DE | 2719995 A | 11/1978 |
| DE | 2856767 A | 7/1980 |
| DE | 3136273 A | 3/1983 |
| EP | 0397482 A | 11/1990 |
| EP | 0681152 A | 11/1995 |
| FR | 998813 A | 1/1952 |

* cited by examiner

*Primary Examiner*—Chen-Wen Jiang
(74) *Attorney, Agent, or Firm*—Kirkpatrick & Lockhart Preston Gates Ellis LLP

(57) ABSTRACT

When using systems that use the principle of absorption for the production of cold there is a great delay between the starting of the installation and the production of cold. This delay is due to the necessary time for the production of vapour.

According to the invention a storing device of cooling liquid under pressure is proposed that is used instead of the vapours produced by a boiler (1) when starting the installation. This storing is done in a receiver (4) commanded by two valves, one called upstream valve (3) and the other called downstream valve (5).

According to the invention the method consists in storing cooling liquid under pressure in a receiver and using this liquid under pressure when starting the installation.

6 Claims, 2 Drawing Sheets

METHOD AND DEVICE FOR ABSORPTION COOLING

The present invention concerns a procedure and device for the production of cold by absorption, and more particularly a procedure and a device for the acceleration of the starting of cooling processes.

A cooling system by absorption comprises schematically a generator, an evaporator, and a condenser. To function, the generator is filled with a mixture of at least two mixable substances, from now on referred to as binary mixture (a coolant and an absorbent). This mixture is combined in an absorber in which the absorption of the coolant by the absorbent takes place. The coolant and the absorbent must have an evaporation pressure sufficiently different in order to, when the generator is heated, the most volatile of the two, be it the coolant, evaporates and transforms itself into a liquid in the condenser.

The absorption system normally includes a pump to return the binary mixture of the absorber towards the generator. The vapours pass through the condenser that condenses them in a liquid, which is taken towards the expansion valve of the evaporator for the desired cooling effect.

This principle being based on the heating of the binary mixture, the starting process is relatively slow. In fact, the temperature of the binary mixture has to be risen to several tens of degrees before becoming vapour. While the vapour is not produced the cooling function remains without effect.

Such a device, according to the preamble of Claim 1, is described in the document DE 28 56 767 A.

The objective of the present invention is to allow the production of cold by such a system from the starting of the cooling system.

This objective is achieved by a storing device of the coolant under pressure in a receiver supplied to this effect, and by a control of access to said receiver by means of two valves.

According to the invention the mixture under pressure is accumulated in a receiver during the normal functioning of the cooling system. Once the system is stopped this coolant under pressure is stored in the receiver thanks to a closing of the valves upstream and downstream of the receiver. The latter is then isolated from the cooling circuit and conserves thus the coolant under pressure.

From the starting of the cooling system this pressure will be used to feed coolant liquid under pressure the cooling circuit and thus to immediately produce cold. To this effect the valve downstream towards the evaporator will be open while the valve upstream of the condenser side is kept closed. The latter remains closed as long as the pressure at the exit of the condenser is lower than that in the receiver.

Once the process of vapour production is operational the valve upstream lets pass the coolant under pressure which on the one hand will feed the evaporator and on the other hand will fill the receiver for a next use.

The invention will be better understood with the help of the following detailed description referring to the annexed figures which are given as a non-limiting example, in which.

Figure 1:
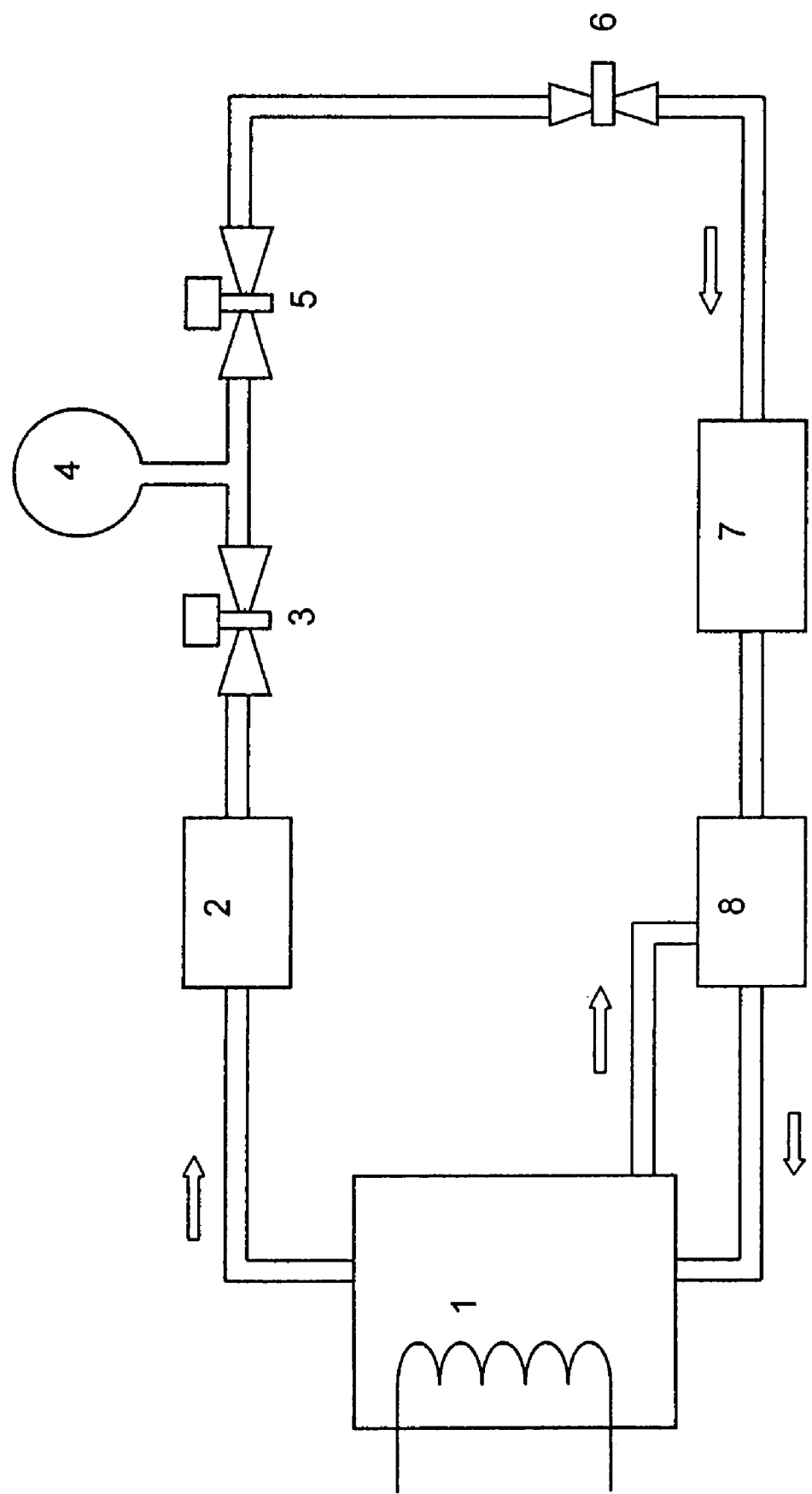
FIG. 1 represents the storing device of the coolant under pressure

In FIG. 1 the generator 1 uses as an energy source a resistor. The mixture coolant-absorbent is heated and the most volatile of the two components, be it the coolant, is transformed into vapour. These vapours are condensed in a liquid in the condenser 2. The liquid under pressure then arrives in the valve upstream 3 of the receiver 4 that allows to access the receiver 4. This upstream valve 3 can for example be commanded electrically by a device that measures the different pressures. It can also be a differential valve that opens when the pressure upstream exceeds the pressure downstream. It then works as an anti-return valve.

Downstream of the receiver 4 a second valve 5 is necessary for the functioning of the assembly. This valve is generally commanded by the feeding of the system. When the cooling system is interrupted it is immediately closed in order to keep the pressure in the receiver 4. In the same way when the system is started it opens so that the coolant under pressure can feed the evaporator 7 by the expansion valve 6.

The coolant is then taken into the absorber 8 that mixes it with the absorbent to be re-injected in the generator 1.

The heat generated in the generator 1 can have different origins. According to the representation of FIG. 1, it can be of electric origin or it can come from other heat sources, for example from the exhaust gases of a combustion engine.

According to one embodiment it is possible to add a supplementary valve for the access to the receiver in order to not slow down the starting of the process in the case where the receiver is empty. This valve only opens when the system produces enough liquid under pressure in order to be able to store a part in said receiver.

According to a particular embodiment of the invention it is possible during the stopping of the cooling system to close the downstream valve 5 before stopping the vapour production. In this way a suppression is produced in the condenser 2 which will be stored in the receiver 4. When the desired pressure is achieved the generator 1 is started. This suppression accumulated in the receiver 4 will be able to produce longer cold until a next re-starting of the system.

Figure 2:
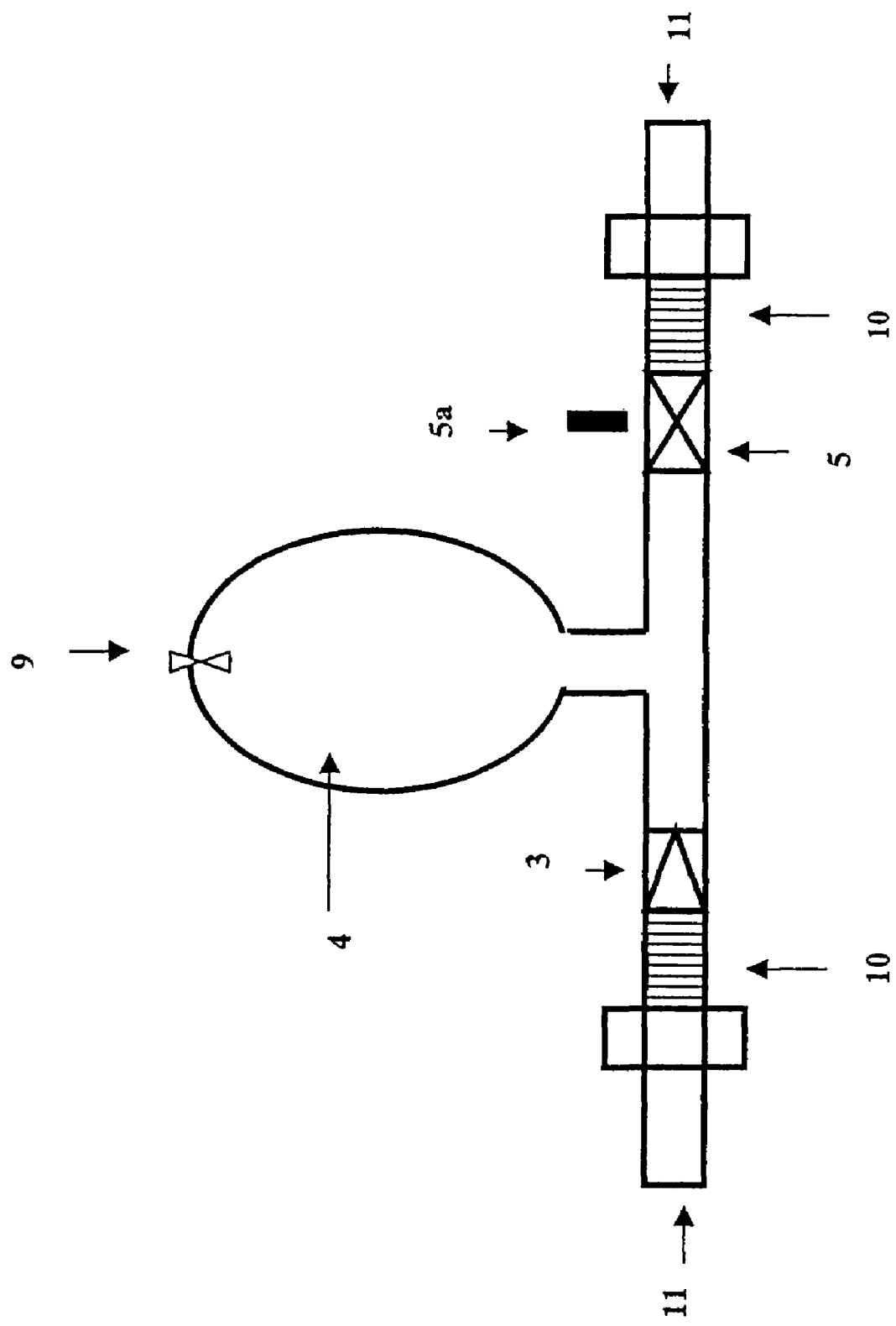
FIG. 2 represents a monoblock embodiment.

To satisfy security criteria a monoblock embodiment of the assembly is proposed such as illustrated in FIG. 2. This assembly is composed of a receiver 4 with its wall not welded, moulded in one piece in a material resistant to ammonia. Furthermore, it is sized to support a pressure of 50 atmospheres.

As indicated above this assembly is equipped with a non-return valve upstream 3, an electrovalve downstream 5, as well as a security valve 9 calibrated at 40 atmospheres. The three elements: non-return valve, electrovalve, and security valve are parts of the assembly and cannot be replaced individually.

From this fact the replacement of the receiver assembly may be done without danger even if in the receiver the ammonia under pressure remains. Only the coil 5 a of the electrovalve 5 can be replaced individually.

The two ends of the tube 10 are either welded or connected by means of two conical connectors with deformable joints 11.

The proposed assembly can have different shapes and sizes following the vehicle or machine on which it is assembled.

In certain cases the non-return valve 3 is replaced by an electrovalve.

The invention claimed is:

1. A system for the production of cold by absorption comprising a generator (1), a condenser (2), an evaporator (7), an expansion valve (6), an absorber (8), and a storing assembly of cooling liquid under pressure composed of at least one receiver (4), a valve (3) upstream of the receiver (4) and a valve (5) downstream of said receiver characterised in that the upstream valve (3) is passing when the pressure upstream is greater than or equal to the pressure downstream, and in that, in response to interrupting operation of the system to produce cold, the downstream valve (5) is blocked when or before the generator (1) stops producing vapor.

2. A system according to claim 1, characterised in that the assembly receiver (4), upstream valve (3), and downstream valve (5) are assembled so that these three elements cannot be disassembled.

3. A system according to claim 1, characterised in that the upstream valve (3) is an electrovalve.

4. A method for producing cold by absorption comprising the following stages:

heating of a mixture coolant-absorbent until the evaporation of the coolant in a boiler (1), condensation of the coolant vapours in liquid form in a condenser (2), expansion of the coolant under pressure in an evaporator (7), absorption of the expanded coolant with the absorbent in an absorber (8);

storing of the coolant in liquid form in a receiver (4) placed between the condenser (2) and the evaporator (7);

characterized in that it comprises also the stages of:

opening of a downstream valve (5) when the production of cold is desired, the receiver releasing the liquid under pressure into the evaporator (7) to produce cold, opening of an upstream valve (3) only when the pressure at the exit of the condenser (2) is higher than the pressure inside the receiver (4), and closing of the downstream valve (5), in response to interrupting operation of the system to produce cold, when or before the boiler no longer produces vapour.

5. A method according to claim 4, characterized in that the downstream valve (5) is closed a little time before the stopping of vapour production, to produce pressurized cooling liquid that is accumulated in the receiver (4).

6. A system for the production of cold by absorption comprising a generator (1), a condenser (2), an evaporator (7), an expansion valve (6), an absorber (8), and a storing assembly of cooling liquid under pressure composed of at least one receiver (4), a valve (3) upstream of the receiver (4) and a valve (5) downstream of said receiver characterised in that the upstream valve (3) is passing when the pressure upstream is greater than or equal to the pressure downstream, and in that, in response to interrupting operation of the system to produce cold, the downstream valve (5) is blocked when or before the generator (1) stops producing vapor wherein the receiver (4) comprises a security valve (9).

* * * * *